United States Patent [19]

Lippman

[11] 4,203,962

[45] May 20, 1980

[54] PROCESS FOR CONSOLIDATION OF FINE ALUMINA PARTICLES

[75] Inventor: Alfred Lippman, Metairie, La.

[73] Assignee: Toth Aluminum Corporation, New Orleans, La.

[21] Appl. No.: 936,508

[22] Filed: Aug. 24, 1978

[51] Int. Cl.$^2$ .............................................. C01F 7/02
[52] U.S. Cl. ................... 423/625; 23/313 R; 264/66; 264/109
[58] Field of Search ...................... 423/625; 23/313 R; 264/66

[56] References Cited

U.S. PATENT DOCUMENTS

| 4,051,222 | 9/1977 | Guyra | 23/313 R |
| 4,108,971 | 8/1978 | Takumi et al. | 423/625 |

FOREIGN PATENT DOCUMENTS 1190094 10/1959 France .

*Primary Examiner*—Herbert T. Carter
*Attorney, Agent, or Firm*—Holman & Stern

[57] ABSTRACT

A method for the consolidation of fine alumina particles, like those made by the dry oxidation of aluminum chloride, to produce a metallurgical grade alumina that resembles Bayer alumina in the following properties; dissolving as well in a Hall cell; absorption of water; absorption of hydrogen fluoride gas to eliminate that contaminant from the Hall cell offgases in a fluid bed; bulk density; particle size distribution; purity and handling.

The method comprises the uniform admixture of caustic soda solution, compressing, autoclaving, then drying and calcining the mass; finally crushing and screening the solid product with recycling of the fines.

10 Claims, No Drawings

PROCESS FOR CONSOLIDATION OF FINE ALUMINA PARTICLES

BACKGROUND OF THE INVENTION

Up to the present moment, the Bayer process is the only commerical method used to manufacture alumina for the Hall electrolytic cells. The Bayer-Hall process is over 100 years old, and requires feed of good quality bauxite which is of limited global reserve and the price of which has escalated rapidly. Also there is a heavy capital demand due largely to the slow precipitation rate of the hydrate and long 45–72 hour slurry retention time. The combination of high bauxite and capital costs results in high alumina cost. Accordingly, the security and perpetuation of the aluminum industry, especially domestic, and the maintenance of the competitive position of aluminum metal would demand the development of a process that could economically use other alumininous ores, especially domestic.

Considerable research work has been done on processes to make alumina from kaolinitic clay of which there is a virtually unlimited reserve in the USA and worldwide. These processes use various techniques for the extraction of the alumina from the ores, principally by the use of aqueous acid extractions of the alumina such as AlcanPechiney H+ process using hydrochloric and sulfuric acids, which is now being piloted, as well as other processes such as those using nitric or hydrochloric acids on which the U.S. Bureau of Mines is working on pilot plant designs. These processes produce very fine alumina by the hydrolysis and dehydration of hydrated aluminum salts. However, the most promising process is the Toth process which extracts alumina in the form of anhydrous aluminum chloride from clays and other aluminous ores by carbo-chlorination, purifies the aluminum chloride and then oxidizes it to make a finely divided aluminum oxide. However, as with the aforelisted acid processes, there is one obstacle to utilization of the aluminum oxide produced; the fine powders are too light and bulky for economic transport, handling and introduction into the hot Hall cells wherefrom they would be carried away by the offgases.

In addition, the alumina must have the capability of absorbing hydrogen fluoride gases from the Hall cell offgases which is an economically necessary property of alumina today.

Hall cell offgases are passed through a fluid bed containing the feed alumina wherein the hydrogen fluoride is absorbed in the alumina not only removing the HF, a severely corrosive and toxic pollutant, but in addition recovering the very valuable fluorine component in usable form in the alumina feed. Previously large outlays were made for additional cryolite and aluminum fluoride since other pollution control methods did not remove the HF pollutant in usable form. This method for removal of the HF is described in U.S. Pat. No. 3,760,565.

It is a principal objective of the instant invention to produce an alumina that can be made in the aforementioned manner to absorb HF from Hall-cell offgases in a fluid bed.

Up to the time of the instant invention, only Bayer alumina was available to operate satisfactorily in such a mode, so a crying need was obvious for a process to inexpensively convert the finely divided alumina made by other processes than Bayer into alumina having about the same bulk density, particle size and handling characteristics as Bayer alumina and that would also dissolve as readily in cryolite as Bayer alumina and that would also absorb HF in the prescribed fluid beds as well as Bayer alumina without excessive degradation: all this without interfering with the high purity demanded in a Hall cell alumina feed nor with the maximum 1.5% moisture content specification. All this has been accomplished by the instant invention at low cost.

Extensive prior art search indicated no close reference probably because of the unique fine alumina produced in this process and the need to have many specific properties in the final granular product which required the invention of applicant's unique and novel process of agglomeration. French Pat. No. 1,190,094 seems the nearest reference but it applies to making granules of activated alumina from conventional Bayer alumina hydrate particles. The inventor does not make or use alumina hydrate: does not make activated alumina from alumina hydrate, nor does he follow the reference's procedure.

SUMMARY OF THE INVENTION

The aluminum oxide produced by the Toth process for example, comprises particles containing alpha and with some amorphous alumina and optionally with delta, chi, gamma or other transition phases of alumina also producible. The particle size varies from 1 to about 20 microns. A typical average size is about 10 microns. The surface area of this material can be controlled from 8 to 50 sq. meters per gram with an average ordinarily of 8–20 sq. m/g. The bulk density of the material is only 15–20 pounds per cubic foot. The solubility in cryolite at 950° C. is 7% by weight of cryolite, dissolving within 10 minutes.

In this invention the fine alumina is first admixed with a solution of caustic soda the amount of which would be limited by the specifications for metallurgical grade alumina to maximum of 0.7%, preferably ranging from 0.2 to 0.7% caustic soda expressed as $Na_2O$. The concentration of this solution is that which will afford satisfactory uniform spreading of the solution, preferably but not necessarily aqueous, over the surfaces of the particles and usually runs about 2–8% NaOH by weight. For a 0.7% $Na_2O$ content, some 22.6 grams of the solution is required per 100 g. of materials. However, about ⅓–½ of that amount also produces good results. The mixture of alumina and caustic solution is then briquetted, pressed, pelletized, tableted, balled, or otherwise compressed at a pressure of at least about 5 tons per square inch or equivalent, into a dense mass with compressed shapes having a density of approximately 0.9–1.1 grams/cc. Compression in a 1" cylindrical die gets good results at 5–100 tons/sq. in. pressure. The compacted material is then placed in an autoclave wherein it is heated at 150°–250° C. for about 3–12 hours at pressure normal for the solution involved. A small amount of water can also be introduced in a container in the autoclave to maintain a high concentration of water in contact with the alumina during autoclaving. The temperature is then brought down to about 100° C., the contents are removed from the autoclave and are placed first in a dryer to remove free moisture at about 110°–130° C., then calcined at 400°–900° C. for about ½–1 hour. The alumina particles then are firmly bound together in the compact and the cooled product is roll-crushed and screened to produce a final marketable product between about 100 mesh and no more than 10% -325 mesh which corresponds to regular Bayer metallurgical grade alumina. Coarse material is recycled through the crusher and any excess -325 mesh fines are recycled with the feed alumina.

It is understood that conditions aforementioned and the following example while illustrative of the invention do not limit its scope in which there is considerable latitude. For instance, the method of compacting the powder after addition of caustic can be achieved through conventional tableting or plunger type presses, through balling in rotary cyclinders or discs, through briquetting, sheet rollers, and other conventional means for compacting powders. Soluble alkali metal hydroxides and alkalis materials equivalent in effect to NaOH can be used provided they meet the current reduction cell specification. The process of this invention also is applicable to the fine aluminas as those produced by the aforementioned acid processes.

PREFERRED EMBODIMENT OF THE INVENTION

A typical example of the practice of this process is: 20 grams of $Al_2O_3$ were mixed with 5 ml of 4% NaOH solution. The mixture was kneaded in a mortar for about 2 minutes. After this, the mixture was pressed in a pellet press at 25 tons/sq. in. for 30 seconds. The pellets were then digested in a sealed autoclave for 6 hours at 150° C. After digestion, the pellets were dried in an oven at 130° C. for 1 hour and then calcined at 500° C. for 30 minutes. The calcination was performed by placing the pellets in a cold muffle furnace and allowing the temperature to rise to 500° C. over the course of 30 to 40 minutes. The calcined material was cooled then ground slowly with a mortar and pestle.

Properties:
Water absorptivity: 1.5% by weight of alumina at 20° C. and 70% rh.
Solubility in cryolite: 7% by wt. of cryolite
HF absorptivity: 5% by wt. of alumina
Hardness—similar to Bayer alumina
Screen analysis—100×250 mesh
Bulk density—62.5 lbs/cu.ft.

The results obtained by this treatment were most gratifying. The added caustic unexpectedly served several purposes. It acted as a lubricant to provide better compaction of the particles. Under autoclaving it unexpectedly made changes in the particle size so that the individual particles became larger often about double which in itself causes a jamming action and better compaction and strength. The caustic also serves as a solid bond among particles upon evaporation of the water, perhaps also by making sodium aluminate, a good cement. Furthermore, the alkaline sodium aluminate or sodium hydroxide on the surface of the particles would react very effectively to remove the acid HF gases far more effectively than the caustic in Bayer alumina which while of equal percentage is entrapped initially within and among the gibbsite crystals and therefore is not primarily on the surfaces of the Bayer alumina particles hence not so accessible to the HF gas as the soda of this invention.

The time requirement for the autoclaving is related to the temperatures involved with the higher temperatures requiring less time. The criteria for limit of time and temperature are such as to just maintain that combination at which the compact would remain strongly coherent and have the other properties required for the compression, autoclaving, calcination and grinding steps. Unacceptable conditions would cause adverse changes, the product being weaker, or less absorptive of HF or inadequately soluble in cryolite. Of course, the cost of equipment and energy to raise the temperature and pressure must also be optimized for each particular type of product treated. The drying cannot be so fast as to disrupt the compact. The upper and lower limits of time and temperature of calcination are determined again by the avoidance of any phases that would be harmful to the aforementioned necessary properties of the product and should not exceed 900° C. for exposure at a little above that temperature for a substantial period causes the HF absorptivity and solubility in cryolite to decrease. The lowest limits of time and temperature and amount of NaOH are those that would just permit and production of an alumina like Bayer alumina in properties and effectiveness. This description explains the inherent broad scope of this invention which is not to be unduly limited by the aforegiven examples. Much higher pressures than 100 tons per square inch also are permissible. Higher concentrations of NaOH in the solution are permissible with more intensive mixing. The drying of the autoclaved mass also can be at temperatures higher than 130° C. provided no disruption of the compressed mass occurs.

I claim:

1. A method for making granules from ultrafine alumina particles comprising the following steps: (1) admixing ultrafine alumina particles with a solution of an alkali metal hydroxide or equivalent alkali in a maximum amount of 0.7 percent equivalent $Na_2O$ by weight based on dry alumina; (2) compressing the mixture obtained in step (1); (3) autoclaving the compressed mixture obtained in step (2) at a temperature of at least 150° C. for at least three hours; (4) drying and calcining the autoclaved compressed mixture obtained in step (3); and (5) comminuting the dried and calcined mass obtained in step (4) to form granules.

2. The method of claim 1 in which the alkali metal hydroxide is sodium hydroxide.

3. The method of claim 2 in which the sodium hydroxide admixed in step (1) is present in the amount of 0.2-0.7 percent equivalent $Na_2O$ by weight based on dry alumina.

4. The method of claim 2 in which the sodium hydroxide is in aqueous solution with a concentration of about 2-8% NaOH by weight.

5. The method of claim 1 in which the pressure in the compression step (2) is at least about 5 tons per square inch or equivalent.

6. The method of claim 1 in which the density of the compressed mass of step (2) is about 0.9-1.1 grams per cubic centimeter.

7. The method of claim 1 in which the autoclaving of step (3) is carried out at 150°-250° C. for about 3-12 hours.

8. The method of claim 1 in which the calcining is carried out in step (4) at 400°-900° C. for about ⅓ to 1 hour.

9. The method of claim 1 in which the calcined mass of step (4) is cooled, comminuted into granules, and screened to size.

10. The method of claim 9 in which any oversize material is recycled back to step (5) and any undersize material is recycled back to step (1).

* * * * *